United States Patent
Sundström

[11] Patent Number: 5,743,162
[45] Date of Patent: Apr. 28, 1998

[54] CUTTING INSERT AND TOOL HOLDER FOR FRICTIONALLY HOLDING THE INSERT

[75] Inventor: Erik Sundström, Sandviken, Sweden

[73] Assignee: Sandvik AB, Sandviken, Sweden

[21] Appl. No.: 709,873

[22] Filed: Sep. 9, 1996

[51] Int. Cl.[6] .................. B23D 61/04; B26D 1/00
[52] U.S. Cl. .................. 83/839; 83/676; 83/698.41
[58] Field of Search .................. 83/839, 835, 838, 83/855, 698.41, 698.31, 698.11, 854, 676; 407/117, 109, 110, 99, 90, 91, 93

[56] References Cited

U.S. PATENT DOCUMENTS

| | | | |
|---|---|---|---|
| 81,811 | 9/1868 | Miller | 83/839 |
| 174,216 | 2/1876 | Emerson . | |
| 246,703 | 9/1881 | Atkins . | |
| 1,926,531 | 9/1933 | Graham | 407/90 X |
| 2,360,336 | 10/1944 | Gibbs | 83/855 |
| 2,485,055 | 10/1949 | Luers | 407/117 X |
| 2,913,024 | 11/1959 | Key | 83/839 X |
| 3,004,902 | 10/1961 | Beckner et al. | 83/855 X |
| 3,236,271 | 2/1966 | Fruits . | |
| 3,323,562 | 6/1967 | Poe | 83/839 |
| 3,523,349 | 8/1970 | Pollington et al. | 407/117 X |
| 4,393,735 | 7/1983 | Eckle et al. | 407/99 X |
| 4,443,136 | 4/1984 | Kemmer . | |
| 4,801,224 | 1/1989 | Pettersson et al. | 407/117 X |
| 4,885,968 | 12/1989 | Tuomaala . | |
| 4,909,677 | 3/1990 | Noguchi et al. | 407/117 X |
| 4,955,273 | 9/1990 | Pawlosky | 83/839 X |
| 5,076,738 | 12/1991 | Pano et al. | 407/117 X |
| 5,315,908 | 5/1994 | Mihic | 83/839 X |
| 5,524,518 | 6/1996 | Sundstrom | 83/835 X |

FOREIGN PATENT DOCUMENTS

| | | | |
|---|---|---|---|
| 625286 | 8/1961 | Canada | 83/839 |
| 218850 A1 | 2/1985 | Germany | 407/99 |
| 4109109 A1 | 9/1992 | Germany | 83/835 |
| WO93/20972 | 10/1993 | WIPO . | |

*Primary Examiner*—Eugenia Jones
*Assistant Examiner*—Charles Goodman
*Attorney, Agent, or Firm*—Burns, Doane, Swecker & Mathis,L.L.P.

[57] ABSTRACT

Cutting insert and tool, wherein the tool has a seat formed by at least 190 degrees of a cylindrical seat surface, and the insert has an outwardly projecting region forming a cutting edge and three convex regions simultaneously touching the cylindrical seat surface at three distinct points. Those points form an imaginary triangle with all angles acute. A center of the cylindrical seat surface lies within the imaginary triangle, and a center of gravity of the insert lies outside of the imaginary triangle. The insert can only be removed from the seat after being rotated by a prescribed angle away from its cutting position.

6 Claims, 1 Drawing Sheet

5,743,162

CUTTING INSERT AND TOOL HOLDER FOR FRICTIONALLY HOLDING THE INSERT

BACKGROUND OF THE INVENTION

The present invention relates to circular saws or slot cutters wherein the cutting edges are defined by separate inserts attached to a tool blank.

It has long been suggested that tools such as circular saws or slot cutters could be made with cutting inserts held in seats in a tool blank by wedging action, as disclosed in U.S. Pat. No. 174,216 and 246,703, but the use of such tools has been very limited for several reasons. For a wedge-shaped insert to be held strongly enough by the wedging action, it must slide into place by a distance much longer than the manufacturing tolerances of the insert and the seat. This requires either that the seat and the insert must be manufactured with extreme precision, which is expensive, or that the seat or some elastic component in the seat be large compared to the tooth height as disclosed in U.S. Pat. No. 3,236,271.

Designs for inserts and seats which are known from lathe or milling tools cannot be used generally for saws since large outwardly directed radial forces may occur during the sawing of wood because of centrifugal forces, and during the sawing of metals because of reverse chip flow when a saw tooth leaves the kerf below the center of the cut piece. This has resulted in legal requirements that inserts for wood saws must be positively locked in their cutting position by their shape, not by friction.

There are a number of known designs for inserts and seats where the seat comprises part of a cylindrical surface, and the insert is shape-locked when it is in the working position, such as disclosed in European Patent 0 058 972 (corresponding to U.S. Pat. No. 4,443,136), U.S. Pat. No. 4,885,968, and International Publication WO93/20972. The insert can be loosened from the seat by being rotated in a direction opposite to the direction in which the cutting force is applied to the insert. If centrifugal force may rotate the insert to the loosening direction, it may be necessary to secure the insert with a rivet. These designs may also be difficult to combine with a gullet shape suitable for collecting and transporting the chips.

It would be desirable to provide a cutting insert and a seat for it, which are simple to make and maintain and wherein the insert is positively shape-locked.

SUMMARY OF THE INVENTION

The present invention relates to a cutting insert adapted to be held in a tool seat without a separate fastener such as a screw or rivet. The insert has a contour which includes an outwardly projection region and three generally convex regions. The outwardly projection region forms a cutting edge, and a tangential support surface. The first, second, and third convex regions each terminate in a rounded support point, the points being located so that they touch an imaginary cylinder, and together form an imaginary triangle with all angles thereof being acute. A center of the imaginary cylinder is located within the imaginary triangle.

The invention also relates to a cutting tool comprising an insert holder and at least one cutting insert. The holder includes a seat for the insert. The seat comprises at least 190° of a cylindrical surface, a generally radial ledge at one end of the cylindrical surface, and a resilient tongue disposed at the other end thereof. The insert has at least one generally convex region forming a cutting edge, and three generally convex regions having distinct support points simultaneously touching the cylindrical surface.

BRIEF DESCRIPTION OF THE DRAWING

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
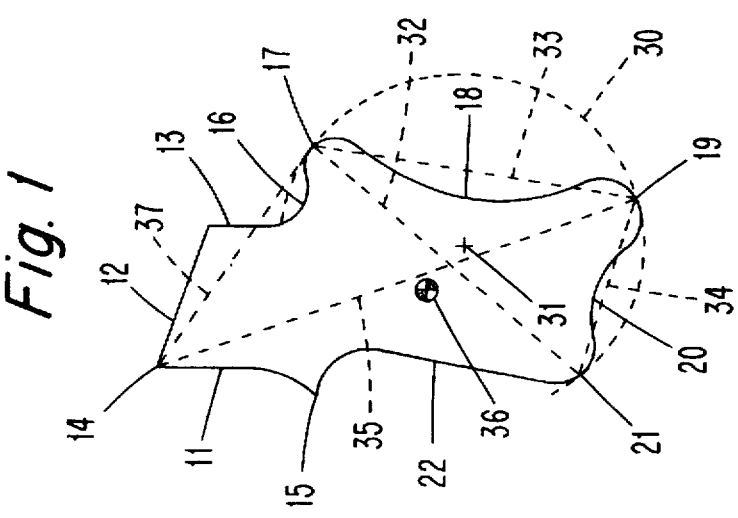
FIG. 1 is a side elevational view of a cutting insert according to the present invention.

FIG. 1 shows a side view of a cutting insert (10) according to the invention. The insert is at least partly made from a hard cutting material such as cemented carbide or high speed steel, and has when viewed from the side, a contour with an outwardly projection region and three generally convex regions. The projection region comprises a cutting edge (14), a rake surface (11), a clearance surface (12) and a tangential support (13). The rake surface is preferentially concave and ends at an outward pointing step (15).

The three convex regions are rounded to have non-abrasive non-cutting support points which are in contact with a cylindrical seat when the insert is in a cutting position. Behind the tangential support (13) is a centrifugal support point (17) separated from the tangential support by a concave upper surface (16). At the step (15) the rake surface (11) meets a front surface (22) which extends down to a friction support point (21). Between the centrifugal support point and the friction support point is a rear surface (18) forming a first separation region and a bottom surface (20) forming a second separation region. The separation regions serve to separate the three convex regions from one another. All portions of the separation regions are disposed closer to the center (31) than are the first, second and third support points (17, 19, 21).

The locations of the support points (17, 19, 21) of the first, second and third convex regions, respectively, are such that they will all be able to simultaneously touch an imaginary cylindrical surface (30) which has a center (31). Thus, the first, second, and third support points (17, 19, 21) are spaced equidistantly from the common center (31). According to the invention, the locations can be chosen to ensure that any cutting force will mainly (i) increase the contact pressure at the radial support point (19) and the tangential support (13), (ii) slightly increasing the contact pressure at the centrifugal support point (17), and (iii) not affect the contact pressure at the friction support point (21). This is achieved if an imaginary triangle (32, 33, 34) drawn with the support points (17, 19, 21) as corners thereof has only acute angles and encloses the center (31), and if an imaginary triangle (33, 35, 37) drawn with the cutting edge (14), the centrifugal support point (17) and the radial support point (19) as corners thereof also encloses the center (31). In other words, the common center (31) is disposed in an area of the insert enclosed by a first line (32) extending between the first and third support points (17, 21), a second line (33) extending between the first and second support points (17, 19), and a third line (34) extending between the second and third support points (19, 21). The first and second convex regions are separated by the first separation surface (18), and the second and third convex regions are separated by the second separation surface (20). To make sure that any centrifugal force will make the insert fit firmer in the seat, the center of gravity (36) of the insert should be located between the center (31) and the front surface (22) or the rake surface (11).

Figure 2:
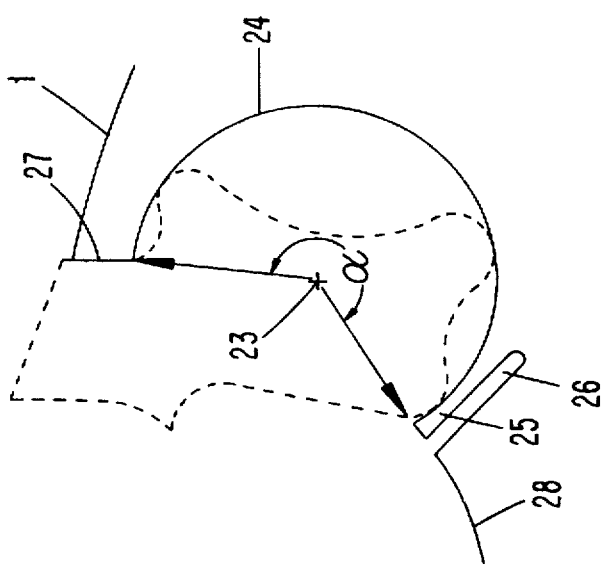
FIG. 2 is a fragmentary view of a tool holder, such as a circular saw blade, depicting a seat for receiving an insert that is shown in broken lines.

FIG. 2 shows a seat machined in a thin tool holder (1), such as a saw blade. The seat comprises a part of a circular cylindrical seat surface (24) whose geometric center defines a seat center (23). The seat surface 24 extends for an angle α of at least 190°, leaving a front opening for insertion of the cutting insert. The upper part of the cylindrical seat surface (24) is terminated by a ledge (27) corresponding to the tangential support (13) of the insert. Adjacent and generally parallel to the lower part of the cylindrical seat surface (24) is a slot (26) which turns the lower part of the seat into a resilient tongue (25). When the seat is empty, the tongue is in its rest position and should project slightly inwards to make sure that there will occur a contact pressure between the tongue (25) and the friction support point (21) when an insert is installed in its cutting position. Below and in front of the tongue (25) and the slot (26) is the gullet (28) where the produced chips are collected and transported out of the kerf. Above and behind the ledge (27) is the tool periphery 29, i.e., in a saw blade the back of the tooth. The cylindrical seat surface (24) shall have the same center and diameter as the afore-described cylindrical surface (30) touching the insert simultaneously at the three support points (17, 19, 21). The tongue (25) is preferably an integral part of the tool holder body, but may also be a separate part attached to the seat.

Figure 3:
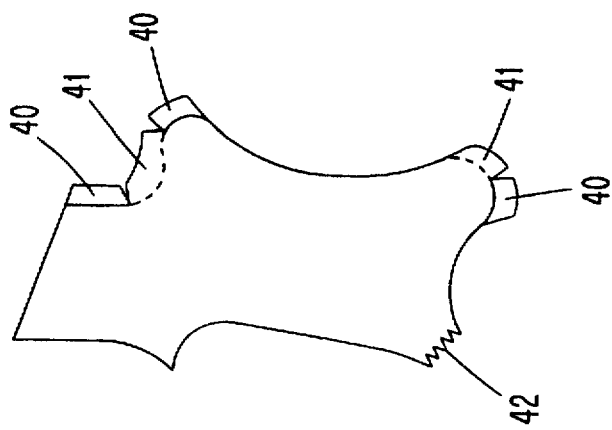
FIG. 3 is a side elevational view of a modified form of the cutting insert.

Insertion of an insert into the seat is done by first introducing the radial support point (19) and the friction support point (21) into the seat until they touch the cylindrical seat surface (24). The insert is then rotated (i.e., clockwise) around the seat center (23) to let the centrifugal support point (17) enter the front opening and slide along the cylindrical surface until halted by the tangential support (13) touching the ledge (27). The rotation is effected by a key, pier or other tool gripping the middle part of the insert over the front and rear surfaces (22, 18). During the latter part of the rotation, the friction support point (21) slides onto the tongue (25) which then elastically rebounds to the diameter of the cylindrical seat surface (24) to exert a well defined force against the friction support point. This force will keep the insert from coming loose if the saw blade is vibrating. This effect will be enhanced if the friction support point (21) is made with a rough or structured surface (42) as shown in FIG. 3.

To remove an insert, it is gripped and rotated in the opposite direction from which it is inserted. As the tangential support (13) moves away from the edge (27), the friction support point (21) will slide off the tongue (25) onto the solid cylindrical surface (24), and the torque necessary to turn the insert will be reduced. When the centrifugal support point (17) leaves the upper part of the cylindrical surface, the insert can be removed from the seat. It is thus not possible to remove the insert from the seat while it is in its cutting position without rotation by a finite angle, even if friction forces are reduced due to vibrations and lubricants.

The center of gravity (36) of the insert is located in front of the centers (31 and 23). This ensures that the centrifugal force and the tangential cutting force occurring during cutting will both help to keep the insert in its cutting position. Radial cutting forces do not occur alone, but only together with tangential cutting forces, and will then only affect the distribution of reaction forces between the support points (17, 19), and will not loosen the insert.

The rake surface (11) may be flat or concave, but should preferably end with a protruding step (15) towards the lower surface (22) to concentrate the pressure from accumulated chips to the rake surface, where they will help keep the insert in its cutting position.

The edge (14) may have different shapes depending on the relation between the sawing direction and the fiber structure of the material sawn, and need not be equal for all inserts of a cutting blade. It can thus be straight, chamfered, angled, inclined or provided with chipbreaking projections or depressions on the rake surface (11). The edge and adjoining surface areas may also be coated with layers of wear resistant materials, especially if the tool is to be used for cutting materials formed of inorganic fibers or fillers. The thickness of the insert should be largest at the edge (14) and in a limited region adjacent to the edge, and preferably tapering off tangentially and radially to reduce friction.

FIG. 3 shows a modified insert (10A) which can be secured in the thickness direction of the tool holder by ridges (40, 41) extending from at least some of the convex regions as extensions of the lateral surfaces past respective sides of the cylindrical seat surface (24). Thus, the ridges (40, 41) prevent the insert from being dislodged from the tool holder in a direction perpendicular to the paper in FIG. 2. If the insert thickness is only slightly thicker than the tool seat body, the seat can be chamfered along the ledge (27) and the cylindrical surface (24). To simplify manufacture of the insert by powder compaction from the sides, the ridges may be interrupted and distributed alternatingly on the left and the right side.

If a rough or structured surface (42) of the friction support point (21) is not enough to keep an insert from loosening by vibrations, the insert can be secured with a pin or rivet as known from German Patent No. 34 12 976 (corresponding to U.S. Pat. No. 4,885,968), or with some limited strength adhesive material.

If the seat becomes worn after long use, it can be simply reconditioned by widening of the slot (26) with a screwdriver or other implement, to increase the pressure against the friction support point (21) without sacrificing the precision of the edge.

Inserts and seats according to the invention are suited for all applications where the thickness of the insert and the tool is so restricted that it is difficult to use screws, especially where outward radial forces may occur, such as saw blades, slot milling cutters and parting tools.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert adapted to be held in a tool seat without separate fasteners; the insert having a contour which includes an outwardly projecting region and first, second, and third convex regions; the projecting region forming a cutting edge; the first, second, and third convex regions terminating in first, second, and third support points, respectively; the first, second, and third support points being equidistantly spaced from a common point situated in an area of the insert enclosed by a first line extending between the first and third support points, a second line extending between the first and second support points, and a third line extending between the second and third support points; the first and second convex regions being separated by a first separation region of the contour, and the second and third convex regions being separated by a second separation region of the contour; all portions of the first and second separation regions being disposed closer to the common point than are the first, second and third support points.

2. Cutting insert according to claim 1, wherein the insert includes ridges extending from at least some of the convex regions to define extensions of lateral surfaces of the insert.

3. Cutting insert according to claim 1, wherein one of the support points has a textured surface to increase friction.

4. Cutting tool comprising an insert holder and at least one cutting insert, the holder including a seat for the insert, the seat comprising at least 190 degrees of a cylindrical surface defining a center of curvature; a generally radial ledge adjacent one end of the cylindrical surface; and a resilient tongue adjacent the other end thereof; the insert having a contour which includes an outwardly projecting region and first, second, and third convex regions; the projecting region forming a cutting edge extending out of the seat; the first, second, and third convex regions terminating in first, second, and third support points, respectively; the first, second, and third support points engaging the cylindrical surface and being equidistantly spaced from the center of curvature; the center of curvature being situated in an area of the insert enclosed by: a first line extending between the first and third support points, a second line extending between the first and second support points, and a third line extending between the second and third support points; the first and second convex regions being separated by a first separation region of the contour, and the second and third convex regions being separated by a second separation region of the contour; all portions of the first and second separation regions being disposed closer to the center of curvature than are the first, second and third support points.

5. Cutting tool according to claim 4, wherein the tongue is formed between one end of the cylindrical surface and an open slot disposed mainly generally tangential to the cylindrical surface.

6. Cutting tool according to claim 4, wherein the insert further includes ridges extending from at least some of the convex regions of the insert to define extensions of lateral surfaces of the insert.

* * * * *